United States Patent Office
3,406,069
Patented Oct. 15, 1968

3,406,069
PHOTOGRAPHIC ELEMENT AND PROCESS
Joseph De Witt Overman, Eatontown, N.J., assignor to
E. I. du Pont de Nemours and Company, Wilmington,
Del., a corporation of Delaware
No Drawing. Filed June 3, 1965, Ser. No. 461,200
15 Claims. (Cl. 96—74)

ABSTRACT OF THE DISCLOSURE

A photographic element comprising a support, a light-sensitive silver halide layer and a layer, e.g., a filter layer or antihalation layer comprising an organic binder and a metal chelate of a fuchsone dyestuff containing at least one carboxyl group ortho to a quinone or hydroxyl group in at least one of the benzene rings of the triphenyl methane structure of said dyestuff.

---

This invention relates to filter layers for photographic elements. More particularly this invention relates to coloring materials for filter layers for photographic elements. Still more particularly, this invention relates to metal chelates of fuchsone-type dyes as coloring materials for filter layers for color photographic elements.

A number of dyes including those of the fuchsone-type which have been proposed for the preparation of filter layers and antihalation layers in photographic elements must, of necessity possess several characteristics, without which, they are in some degree unsatisfactory. For example, one requirement is that the dye be non-migratory from the layer in which it is incorporated. More specifically, filter dyes must be incapable of migrating to adjacent light-sensitive layers during the manufacture of, for example, multilayer films used in color photography. Also the dyes must be inert with respect to any chemicals in said light-sensitive layers. It is also imperative that the dyes do not have any deleterious effect on any of the processing baths. A further very important requirement is that the dyes be readily dischargeable in photographic processing solutions. The fuchsone dyes and many of the prior art coloring materials are deficient in one or more of the above characteristics.

It has now been found that dyes meeting the above requirements can be made by forming metal chelates of fuchsone dyestuffs containing at least one carboxyl group ortho to a quinone or hydroxyl group in at least one of the benzene rings of the triphenyl methane structure. The chelates are readily formed in organic colloidal binders such as gelatin to provide filter layers which are highly useful in photographic elements, particularly those intended for color photography. The dyes used in this invention are the metal chelates of compounds having the following general formula:

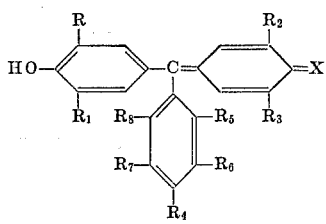

where X represents oxygen or

R, $R_1$, $R_2$, $R_3$ represent hydrogen, lower alkyl, alkoxy, carboxyl, amido, and halogen groups and $R_4$ represents hydrogen, alkyl, alkoxy, carboxy amino, substituted amino, e.g., phenyl, dimethyl, diethyl, methyl-cyanoethyl, hydroxy, amido, e.g., acetamido and the group:

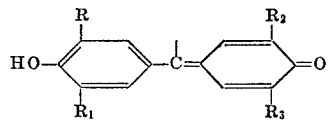

where the R's have the above meaning, and $R_5$, $R_6$, $R_7$ and $R_8$ represent hydrogen, amino, hydroxy, lower alkyl, halogen, carboxyl, sulfo, and amido, e.g., acetamido, stearylamido, etc.

Among the dyes represented by the above generic formula which can be used in practicing our invention are those represented by the following formulae:

(1) 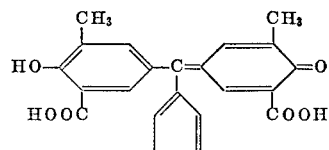

(2) 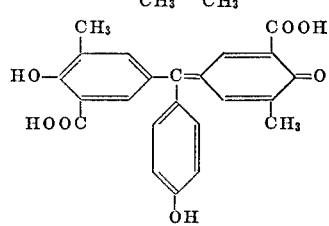

(3) 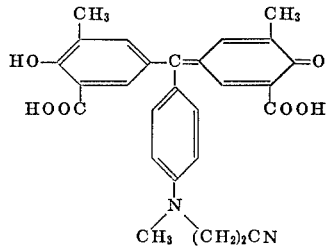

(4) 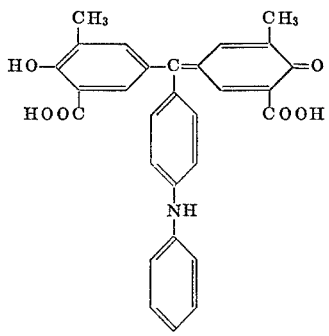

(5) 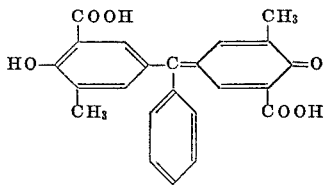

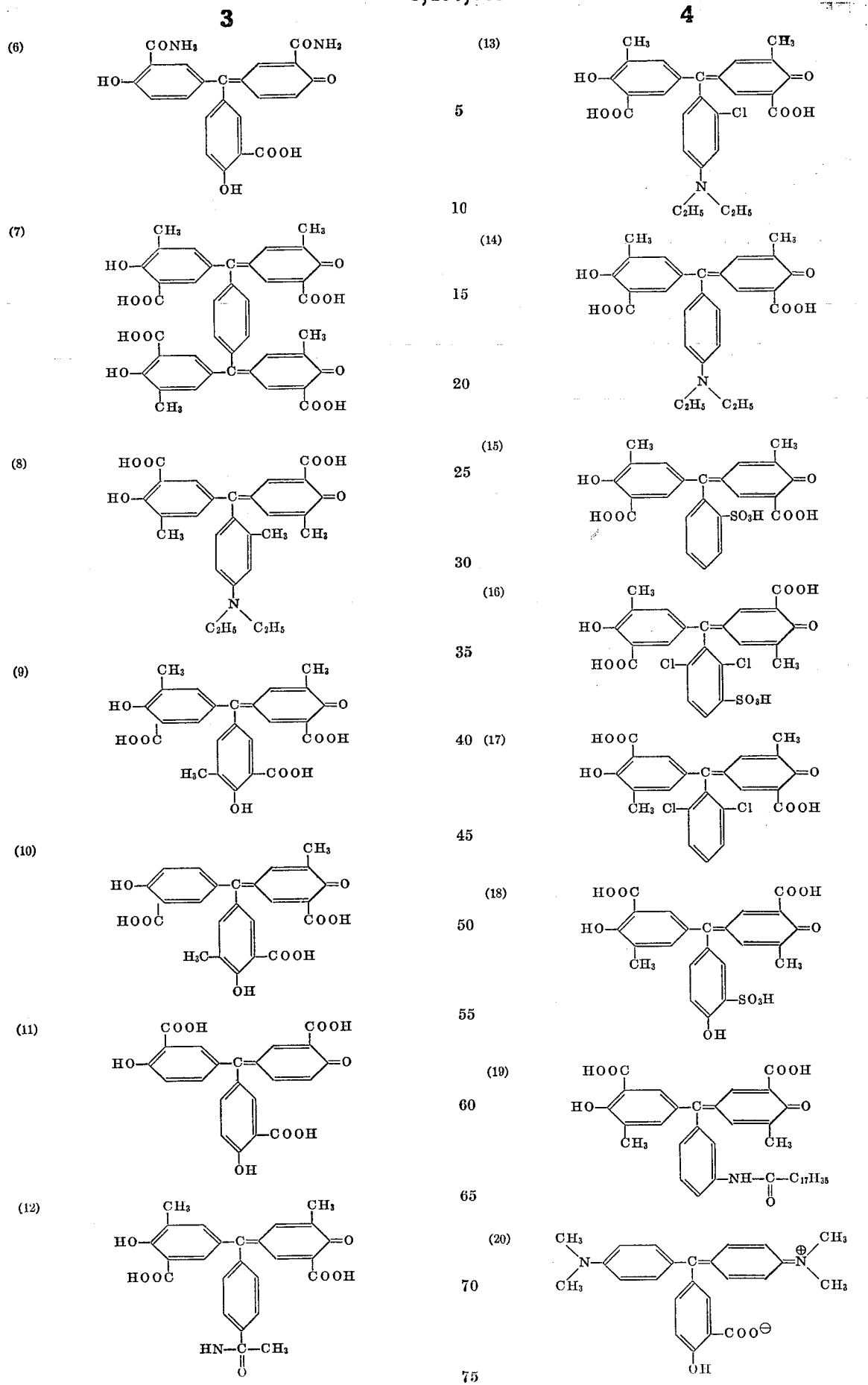

(21) 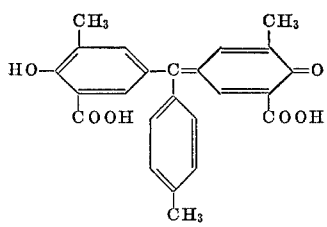

Multivalent metal cations which may be used to form chelates of the above dyes can be aluminum, iron, chromium, zinc, lead, manganese, lanthanum, nickel, tin, cadmium, cobalt, zirconium, copper and others. The multivalent metals may be used in the form of their water soluble salts, for example, aluminum chloride and potassium aluminum sulfate. Aluminum is the preferred metal because of the ease of chelate formation and its inertness with respect to photographic systems. It is also preferred because dye chelates of this metal have a higher coefficient of extinction than chelates of other metals. Other metal chelates, however, may be equally suitable depending on the light absorption characteristics desired.

The polyvalent metal-dye chelates of this invention are simple to prepare. They may be prepared by dissolving the fuchsone-type dye in an aqueous gelatin solution at a pH approximately 10 or above and, then adding an aqueous solution of a water-soluble salt of the polyvalent metal for example, aluminum chloride. Addition of the multivalent cation salt lowers the pH and the preparation is usually adjusted to a pH of about 6.0–6.5. Any ordinary acid may be used to lower the pH as long as it does not form a metal chelate. The resulting gelatin composition containing the dispersed metal chelate is then ready for coating and drying in a conventional manner. The quantities of dyes and metal salts which have been found useful in forming chelates in the process are on a mole for mole basis although this will vary depending on the number chelating sites (carboxyl groups ortho to the quinone or hydroxyl groups) in the dye and the valence of the metal cation. As little as ⅔ of a mole of the aluminum salt and as much as 1½ moles have been found to be satisfactory. It is usually preferred to add the minimum amount of the metal salt which will produce the maximum color with a given amount of the chelating dye compound.

While there are many advantages obtained by using the above mentioned chelates, the primary advantages are the color stability and non-migratory nature of these chelates in photographic elements. The fuchsone-type dyes used in the prior art for antihalation layers gave excellent colors at high pH values (i.e., pH 8 or more). However, the lower pH values of about 6.0–6.5 would cause the color to weaken or disappear. The latter pH range is often necessary for coating procedures resulting in loss of color. Additionally, these chelates are water insoluble and therefore eliminate the problems caused by dye migration.

The invention will now be illustrated further by the following specific examples, but these examples are not to be construed as limiting the scope of the invention except as defined by the claims.

Example I

To a solution comprising 7200 ml. of water and 200 g. of gelatin there was added with stirring 500 ml. of an aqueous solution containing 45 g. of the sodium salt of dye (1) above. There was then added 52 ml. of 3 N sodium hydroxide and finally 500 ml. of an aqueous solution containing 30.8 g. of potassium aluminum sulfate. After thoroughly mixing, the resulting colored gelatin composition was coated on a clear film support comprising cellulose triacetate with a conventional gelatin subbing layer, to give a gelatin coating weight of about 20 mg./dm.² and dried in a conventional manner. A filter layer was obtained which had an optical density of .95 when measured at a wavelength of 546 mμ and .80 at 530 mμ. The filter layer was immersed in a conventional black and white silver halide emulsion developing solution and after rinsing and drying, the optical density was again measured. The density had been reduced from .95 to .19 which showed good dischargeability in alkaline developing solution. In conventional color reversal processing the density was reduced to .05. This also indicates good dischargeability in color reversal processing.

Example II

To 200 ml. of water containing 7 g. of gelatin there was added with stirring 1.12 g. of the sodium salt of the dye having the Formula 10 above. The pH of the solution was raised to 10 or slightly above by the addition of 3 N sodium hydroxide. To the resulting composition there was added with stirring 0.64 g. of aluminum chloride in water solution. The colored gelatin solution was coated on a clear film support in an amount to provide a gelatin coating weight of about 20 mg./dm.². Measurement of the optical density at 546 mμ gave a reading of 1.45. Immersion of the coated film in a black and white developing solution and rinsing and drying reduced the density to .05 which indicated excellent dischargeability. When the above chelate dye colored gelatin composition was coated in place of the clear gelatin separator layer in the color reversal film structure of Example II of assignees' Chu et al., U.S. Ser. No. 113,100 filed May 29, 1961, the resolution and sharpness of the exposed and processed color film was greatly improved. In addition, there was no indication that the chelated dye had migrated to adjacent layers during the manufacture of the multilayer film. The use of lanthanum chloride as the metal chelating agent in the same molar quantities as the above aluminum chloride gave a colored gelatin layer having an optical density at 546 mμ of 1.07 and a density of .05 after treatment in an alkaline photographic developer.

Example III

Example II was repeated by making the aluminum chelate of the dye of Formula 12 above. A coating on a film support had an optical density of 1.45 at 546 mμ. When immersed in an alkaline photographic developer, rinsed and dried, the optical density was .09. When treated with a color reversal processing developer the optical density was reduced to .05.

Example IV

Example II was repeated by making the aluminum chelate of the dye of Formula 15 above. The optical density of the dyed layer at 546 mμ was 1.45. Treatment of the layer with an alkaline developer reduced this density to .03.

Example V

The non-diffusible behavior of these dyes may be illustrated as follows. A coating was made using the composition described in Example II to give a gelatin coating weight of about 10 mg./dm.². The optical density at 546 mμ was .61. After soaking a sample of this coating in water for 2 hours, the sample was removed and dried. The optical density was again measured and found to be .61 indicating the dye had not washed out.

All of the carboxylated fuchsone dyes of this invention are readily soluble in aqueous neutral or alkaline solutions and aqueous neutral or alkaline gelatin solutions. Upon chelation with a multivalent metal cation and lowering of the pH of the system to 7.5 or below, the dyes become completely non-diffusible. This, of course, facilitates their use in gelatin filter layers. Upon treating the dyes gelatin layers with alkaline developer solutions, the dyes are easily and quickly discharged from the layer.

The concentration of the dye in the layer may vary considerably depending upon the product in which the filter layer is to be used. The procedures for determining the proper concentrations are well known to those skilled in the photographic emulsion art. The coating weight of the dye when used as a filter layer or antihalation layer may be readily adjusted to provide the optical density necessary for the specific use. Typical coating weights of the organic component of the dye-chelate may run from about 4 mg./dm.$^2$ to 35 mg./dm.$^2$.

Although gelatin is the preferred agent for dispersing the chelated dyes, other natural or synthetic water-permeable colloid binding agents may be used such as albumin, agar-agar, polyvinyl alcohol and its water-soluble derivatives, e.g., partially hydrolyzed polyvinyl acetates, polyvinyl ethers and acetates containing a large number of extra linear —CH$_2$CHOH— groups; hydrolyzed interpolymers of vinyl acetate and unsaturated addition polymerizable compounds such as maleic anhydride, acrylic and methacrylic acid ethyl esters, and styrene. Suitable colloids of the last mentioned type are disclosed in U.S. Patents 2,276,322; 2,276,323; and 2,347,811. The useful polyvinyl acetates include polyvinyl butyraldehyde acetate and polyvinyl sodium o-sulfobenzaldehyde acetate. Other useful colloid binding agents include the poly-N-vinyl-lactams of Bolton U.S. Patent 2,495,918, the hydrophilic copolymer of N-acrylamide alkyl betaines described in Shacklett U.S. Patent 2,833,050 and hydrophilic cellulose ether esters.

The metal chelated dyes of this invention are particularly useful in multilayer color reversal films for increasing the sharpness of the respective images in each layer. However, the chelated dyes are not limited to this application and may be utilized in other types of color films and black and white photographic elements, as antihalation layers and overcoating layers.

What is claimed is:

1. A photographic element comprising a support, a light-sensitive silver halide layer and a layer of a multivalent metal chelate of a fuchsone dye in an organic binder; said fuchsone dye having the formula

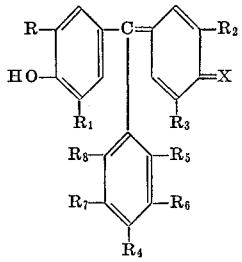

where X is selected from the group consisting of O and N<, R, R$_1$, R$_2$ and R$_3$ are selected from the group consisting of hydrogen, lower alkyl, alkoxy, carboxyl, amido and halogen groups; R$_4$ is selected from the group consisting of hydrogen, alkyl, amino, substituted amino, hydroxy, amido and the group

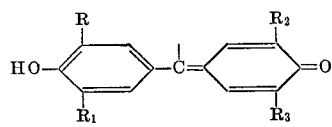

where the R's are defined above and R$_5$, R$_6$, R$_7$ and R$_8$ are selected from the group consisting of hydrogen, lower alkyl, halogen, carboxyl, sulfo and amido with the proviso that at least one carboxyl group be present in the ortho position to the quinone or hydroxyl group on at least one of the benzene rings.

2. A photographic element as defined in claim 1 where said multivalent metal is selected from the group consisting of aluminum, iron, chromium, zinc, lead, manganese, lanthanum, tin, cadmium, nickel, cobalt, zirconium and copper.

3. A photographic element as defined in claim 1 where said organic binder is gelatin.

4. A photographic element as defined in claim 3 where said polyvalent metal is aluminum.

5. A photographic element as defined in claim 3 where said polyvalent metal is lanthanum.

6. A multilayer color photographic element comprising a support, a sensitized yellow dye-former silver halide layer, a sensitizer magenta dye-former silver halide layer, a sensitized cyan dye-former silver halide layer and a layer of a multivalent metal chelate of a fuchsone dye in an organic binder, said fuchsone dye having the formula

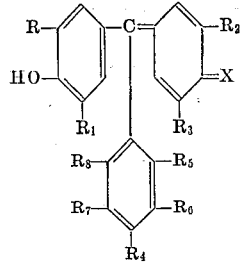

where X is selected from the group consisting of O and N<, R, R$_1$, R$_2$ and R$_3$ are selected from the group consisting of hydrogen, lower alkyl, alkoxy, carboxyl, amido and halogen groups; R$_4$ is selected from the group consisting of hydrogen, alkyl, amino, substituted amino, hydroxy, amido and the group

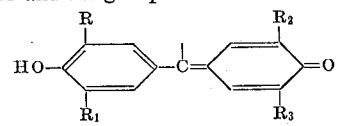

where the R's are defined above and R$_5$, R$_6$, R$_7$ and R$_8$ are selected from the group consisting of hydrogen, lower alkyl, halogen, carboxyl, sulfo and amido with the proviso that at least one carboxyl group be present in the ortho position to the quinone or hydroxyl group on at least one of the benzene rings.

7. A color photographic element as defined in claim 6 where said multivalent metal is selected from the group consisting of aluminum, iron, chromium, zinc, lead, manganese, lanthanum, tin, cadmium, nickel, cobalt, zirconium and copper.

8. A color photographic element as defined in claim 6 where said organic binder is gelatin.

9. A color photographic element as defined in claim 8 where said multivalent metal is aluminum.

10. A color photographic element as defined in claim 8 where said multivalent metal is lanthanum.

11. A process for preparing an antihalation layer which comprises (a) mixing in an aqueous water permeable organic binder solution at a pH of at least about 10, a water soluble salt of a multivalent metal and a fuchsone dye of the formula

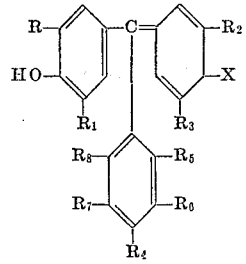

where X is selected from the group consisting of O and N<, R, R$_1$, R$_2$ and R$_3$ are selected from the group consisting of hydrogen, lower alkyl, alkoxy, carboxyl and halogen groups; R$_4$ is selected from the group consisting of hydrogen, alkyl, amino, substituted amino, hydroxy, amido and the group

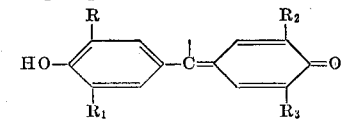

where the R's are defined above and $R_5$, $R_6$, $R_7$ and $R_8$ are selected from the group consisting of hydrogen, lower alkyl, halogen, carboxyl, sulfo and amido with the proviso that at least one carboxyl group be present in the ortho position to the quinone or hydroxyl group on at least one of the benzene rings; (b) adjusting the pH to about 6.0 to 6.5, and (c) coating and drying said mixed solution on a support.

12. A process as defined in claim 11 where said multivalent metal is selected from the group consisting of aluminum, iron, chromium, zinc, lead, manganese, lanthanum, tin, cadmium, nickel, cobalt, zirconium and copper.

13. A process as defined in claim 11 where said organic binder is gelatin.

14. A process as defined in claim 13 where said multivalent metal is aluminum.

15. A process as defined in claim 13 where said multivalent metal is lanthanum.

References Cited

UNITED STATES PATENTS

| | | | |
|---|---|---|---|
| 1,879,537 | 9/1932 | Schneider | 96—84 |
| 3,016,306 | 1/1962 | Mader et al. | 96—69 |

OTHER REFERENCES

Dorman, K. L.: "American Dyestuff Reporter," vol. 32, No. 3, Feb. 1, 1943, pp. 47–49.

NORMAN G. TORCHIN, *Primary Examiner.*

R. H. SMITH, *Assistant Examiner.*